United States Patent [19]

Sedlack

[11] Patent Number: 5,056,865
[45] Date of Patent: Oct. 15, 1991

[54] SHOPPING CART LOCKING MEANS

[75] Inventor: Mark A. Sedlack, Cuyahoga Falls

[73] Assignee: 501 Century Products Co., Macedonia, Ohio

[21] Appl. No.: 609,132

[22] Filed: Oct. 31, 1990

Related U.S. Application Data

[63] Continuation of Ser. No. 394,021, Aug. 15, 1989, abandoned.

[51] Int. Cl.$^5$ .............................................. A47C 1/08
[52] U.S. Cl. .................................... 297/250; 297/216
[58] Field of Search ......................... 297/250, 216, 331

[56] References Cited

U.S. PATENT DOCUMENTS

| | | | |
|---|---|---|---|
| 3,351,380 | 11/1967 | Sprague | 297/377 |
| 4,108,489 | 8/1978 | Salzman . | |
| 4,324,450 | 4/1982 | Dimas et al. | 297/250 |
| 4,403,807 | 9/1983 | Wilkinson . | |
| 4,598,945 | 7/1986 | Hopkins | 297/250 |
| 4,681,368 | 7/1987 | Heath et al. | 297/216 |
| 4,707,024 | 11/1987 | Schrader . | |
| 4,834,404 | 5/1989 | Wood | 297/250 |
| 4,861,105 | 8/1989 | Merten et al. | 297/250 |
| 4,865,377 | 9/1989 | Musser et al. | 297/331 |

FOREIGN PATENT DOCUMENTS 2208109A 3/1989 United Kingdom .

Primary Examiner—Laurie K. Cranmer
Attorney, Agent, or Firm—Townsend and Townsend

[57] ABSTRACT

An infant carrier (2) for secure attachment of a shopping cart (4). The infant carrier includes a seating section (5) for supporting the infant. The seating section includes a bottom portion (6) and a back portion (8) disposed at an angle to the bottom portion. Side portions (10) are located adjacent to and substantially perpendicular to the back and bottom portions. Rear side extensions (12) are coplanar with the side portions, extending rearwardly therefrom, and include a lock (14) for securely attaching the carrier to a horizontal wire (20) of the shopping cart. The lock is disposed on a rear surface (13) of the rear side extensions in an elongated opening (26) formed in the rear surface. The lock includes a resilient cantilever member (28) connected by a connection end (32) at a lower end (30) of the opening. A latch (34) is disposed remote from the lower end for retaining the horizontal wire within a recess (22) formed in the rear side extension. To lock the horizontal wire in the recess, the infant carrier is positioned such that the latch contacts the horizontal wire. The infant carrier is pushed downwardly such that the horizontal wire exerts a force (arrow A) on the latch, pushing the resilient member into the opening. The horizontal wire is thus received in the recess. The resilient member is biased to its normal position such that an upper support surface (42) of the latch retains the horizontal wire within the recess.

20 Claims, 2 Drawing Sheets

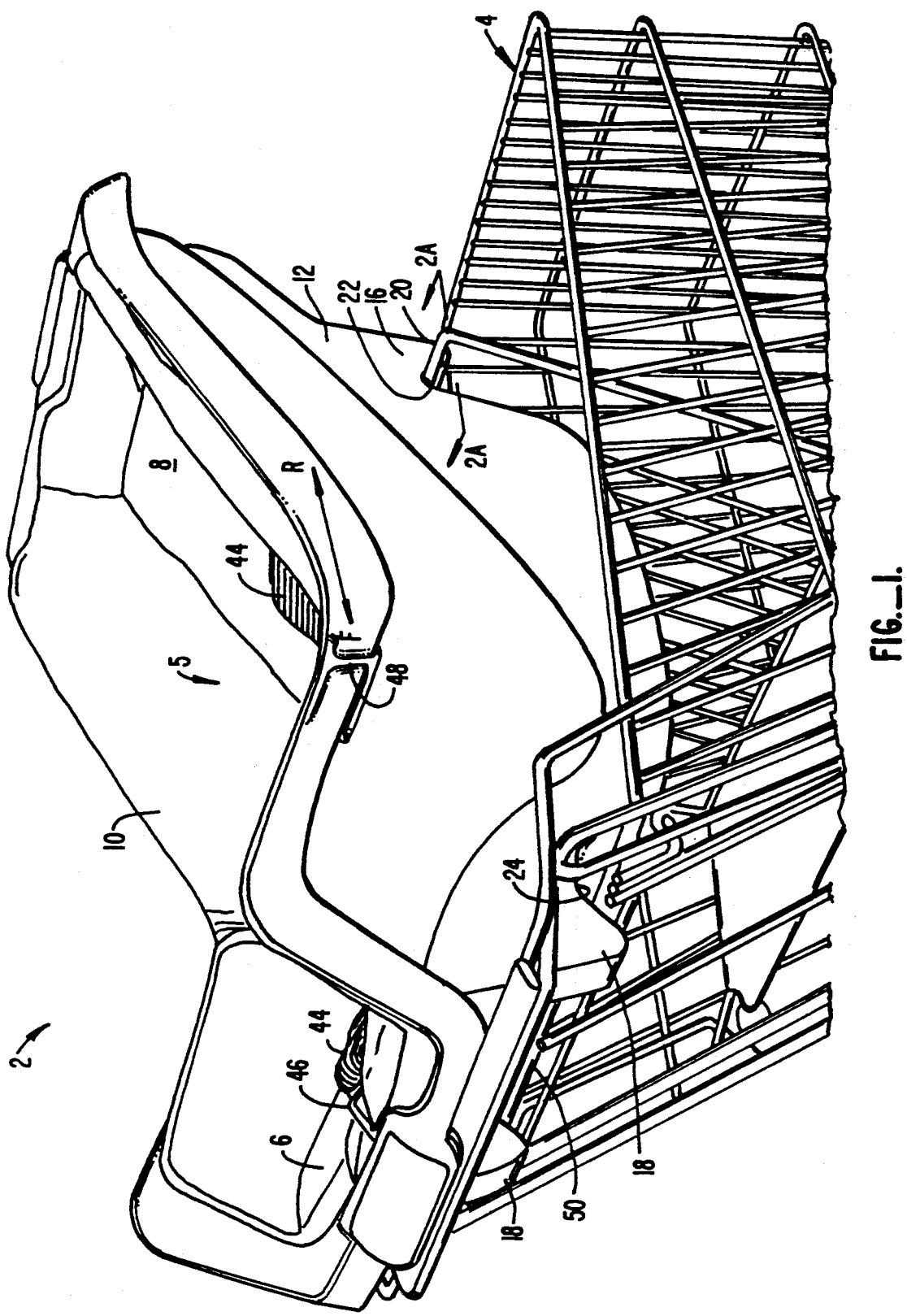
FIG._1.

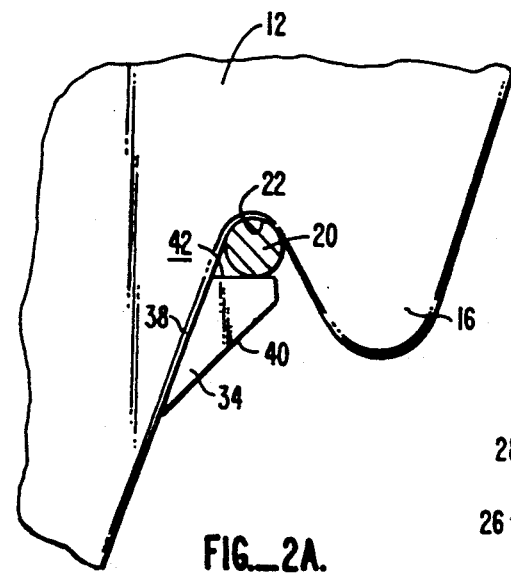
FIG._2A.
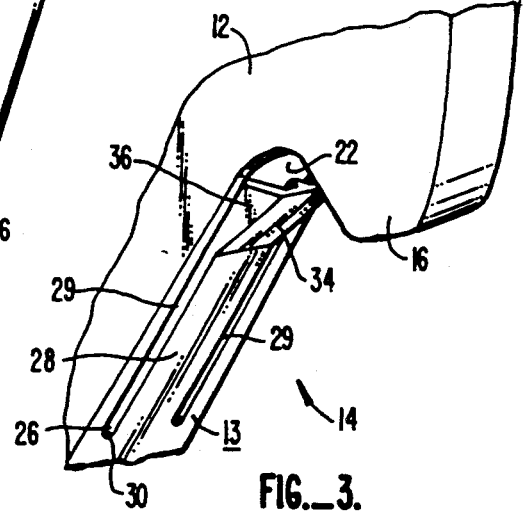
FIG._3.
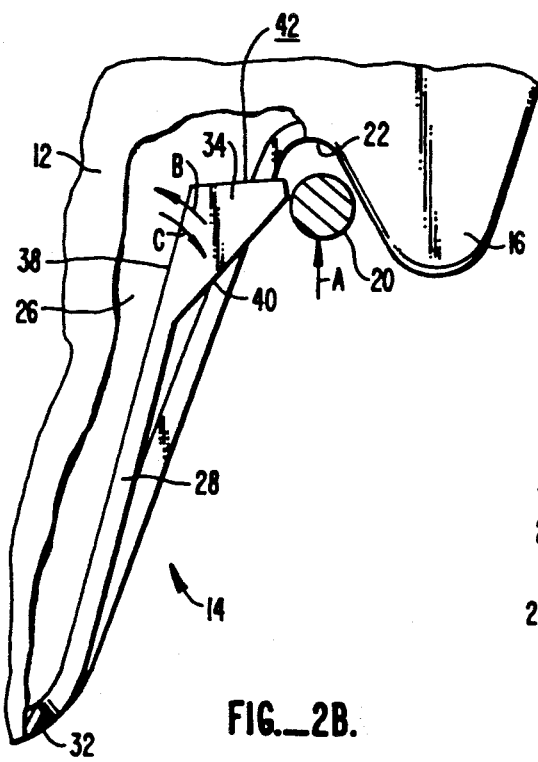
FIG._2B.
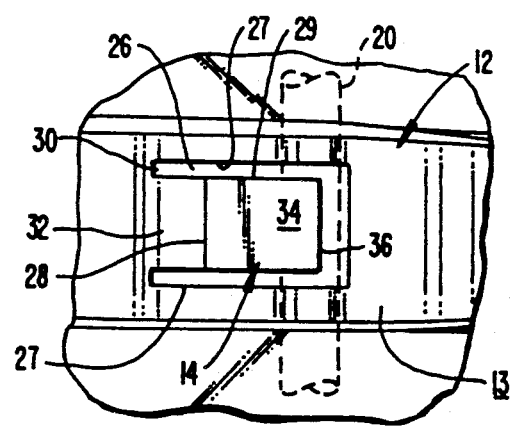
FIG._4.

SHOPPING CART LOCKING MEANS

This is a continuation of application Ser. No. 394,021, filed Aug. 15, 1989, now abandoned.

BACKGROUND OF THE INVENTION

While shopping, parents often take children with them. It can be difficult for parents to keep an eye on children who demand attention while, at the same time, the parents are trying to shop. It is generally easier to carry children in a shopping cart rather than allowing the child to walk or wander by themselves. Shopping carts are often constructed having a flat seating section for toddlers. Small children can be carried by seating them on the seating section. However, infants who are unable to sit upright cannot support themselves on the flat surface. The surfaces are often too wide and do not provide adequate support.

Carriers providing adequate support for infants have been developed for use in automobiles. A child's carseat may be removed from the vehicle to provide a comfortable seat for the infant. When removed from the vehicle, these carseats must be supported on a flat level surface and are not adaptable for use with a shopping cart.

SUMMARY OF THE INVENTION

The present invention relates to an infant carrier which may be securely attached to a shopping cart. As in conventional carseats the carrier includes a bottom portion for supporting the infant's seat and a back portion disposed at an angle to the bottom portion for supporting the infant's back. Two side portions each adjacent to and preferably perpendicular to both the back and bottom portions retain the infant within the seat. The infant carrier of the present invention includes a lock for attaching the seating section to the shopping cart.

For ease of reference, forward and rearward directions are indicated in FIG. 1 by Arrows F and R, respectively. The inward direction of the opening corresponds to the forward direction as seen by Arrow F in FIG. 1. The outward direction corresponds to the rearward direction as seen by Arrow R.

In the preferred embodiment, the infant carrier includes a pair of rear side extensions coplanar with the side portions and extending rearwardly therefrom. Each rear side extension includes a protrusion extending rearwardly and a recess formed between the protrusion and a rear surface of the rear side extensions. The recess is configured to rest on a horizontal wire of the shopping cart.

The lock is positioned in an opening formed in the rear surface. The lock includes a resilient member formed integrally with the rear surface at a lower end of the opening and is received in the opening. A rear side extension is coplanar with each of the side portions and extends rearwardly.

A latch is preferably disposed at a remote end from the lower end and is positioned at an angle to the resilient member. The resilient member is movable within the opening such that when a horizontal wire of the shopping cart is pushed against an actuator side of the latch, the resilient member acts as a cantilever, moving inwardly through the opening, in a forward direction toward the side portions. Once the horizontal wire is positioned within the recess, the resilient member returns to its normal outwardly biased position such that a support surface of the latch engages the horizontal member, thereby retaining the infant carrier in locked position with the shopping cart.

BRIEF DESCRIPTION OF THE DRAWINGS

FIG. 1 is a perspective view of the present invention illustrating the infant carrier locked to a shopping cart.

FIG. 2A is a cross-sectional view taken along lines 2A—2A of FIG. 1.

FIG. 2B is a cross-sectional view of the present invention as the lock is being engaged.

FIG. 3 is a perspective view of the lock.

FIG. 4 is a bottom plan view of the lock.

DETAILED DESCRIPTION OF THE DRAWINGS

Referring now to the drawings. FIG. 1 illustrates an infant carrier 2 constructed in accordance with the present invention shown attached to a shopping cart 4. Infant carrier 2 includes a seating portion 5 for supporting and retaining the infant within the infant carrier. A first protrusion 16 includes a recess 22 for supporting one end of infant carrier 2 on shopping cart 4. A second protrusion 18 includes an indentation 24 for supporting the opposite end of infant carrier 2 on shopping cart 4. A lock 14 is formed adjacent first protrusion 16 for secure attachment of infant carrier 2 to shopping cart 4.

Seating portion 5 includes a bottom portion 6, a back portion 8 and side portions 10. Bottom portion 6 supports the infant's seat. Back portion 8 is disposed at an obtuse angle to bottom portion 6. Side portions 10 are adjacent bottom portion 6 and back portion 8 for enclosing the infant within carrier 2.

Recess 22 has a downwardly directed rounded configuration formed at the juncture of protrusion 16 and rear side extension 12 for supporting infant carrier 2 on a horizontal wire 20 of shopping cart 4. Similarly, indentation 24 supports infant carrier 2 on a forward rod 50 of shopping cart 4. Recess 22 and indentation 24 are oriented such that the horizontal member received within the recess or indentation is positioned perpendicularly to the forward and rearward directions indicated by Arrows F and R. A rear surface 13 is formed in rear side extension 12 forward of recess 22. Lock 14 is formed on rear surface 13.

As most clearly seen in FIGS. 3 and 4, lock 14 includes an opening 26 formed in rear surface 13 forward of protrusion 16, adjacent recess 22. A resilient member 28 is disposed within opening 26. Resilient member 28 is formed integrally with rear surface 13 at a connection end 32 located at a lower end 30 of opening 26. Sides 29 of resilient member 28 are spaced from edges 27 of opening 26.

A latch 34 is positioned on resilient member 28 at a remote end 36 of the resilient member. Latch 34 is generally triangular in shape having a first side 38 coincident with resilient member 28. A second, actuator side 40 is disposed at an angle to resilient member 28, extending rearwardly toward protrusion 16. Triangular latch 34 includes a third side in the form of flat support surface 42. In the locked position as seen in FIG. 2A, horizontal wire 20 is received in recess 22, resting upon support surface 42. Recess 22 is disposed on rear side extension 12, adjacent remote end 36 of opening 26, above latch 34.

In the normal position of lock 14 as seen in FIG. 3, resilient member 28 is biased outwardly acting as a cantilever formed integrally with rear surface 13 at connection end 32. In its normal position, latch 34 is positioned at remote end 36 of resilient member 28 such that support surface 42 is spaced from and faces recess 22.

Infant carrier 2 includes straps 44 having a releasing mechanism 46 for securing the child within infant carrier 2. A slot 48 is formed in each side portion 10 for receiving a seat belt to retain infant carrier 2 within a vehicle.

The operation of infant carrier 2 will now be described. Infant carrier 2 is generally positioned in its use position on shopping cart 4 as shown in FIG. 1. Indentations 24 formed by second protrusions 18 are placed over rod 50 of shopping cart 4 as seen in FIG. 1. Recesses 22 support infant carrier 2 on horizontal wire 20 of shopping cart 4. Horizontal wire 20 may be securely retained within recess 22 by lock 14.

In order to employ lock 14 to secure infant carrier 2 onto shopping cart 4, after balancing infant carrier 2 on rod 50, the rear portion of infant carrier 2 is snapped downwardly such that lock 14 engages horizontal wire 20. Horizontal wire 20 exerts a force on actuator side 40 of latch 34 in the direction of arrow A as seen in FIG. 2B, forcing resilient member 28 inwardly toward opening 26 in the direction of arrow B as seen in FIG. 2B. Horizontal wire 20 is thus stably received within recess 22. During operation of lock 14, resilient member 28 acts as a cantilever attached to rear surface 13 of rear side extension 12 at connection end 32. Once horizontal wire 20 is positioned within recess 22, resilient member 28 returns to assume its normal outwardly biased position as seen in FIG. 3. The direction of this movement is indicated by arrow C as seen in FIG. 2B. Support surface 42 of latch 34 abuts horizontal wire 20 to retain the horizontal wire securely within recess 22 as seen in FIG. 2A. FIG. 4 illustrates a bottom plan view of infant carrier 2 securely fastened to horizontal wire 20 (shown in dashed lines) by lock 14.

Removal of infant carrier 2 from shopping cart 4 will now be described. The user lifts infant carrier 2 such that horizontal wire 20 exerts a force in the opposite direction of arrow A. Resilient member 28 moves further outwardly in the direction of arrow C so that horizontal wire 20 may be removed from recess 22. Once horizontal wire 20 is removed from recess 22 and first protrusion 16, resilient member 28 returns to its normally biased position, in the direction of arrow B. as seen in FIG. 2B.

Conventional straps 44 and releasing mechanism 46 may be employed to retain the infant within carrier 2. Infant carrier 2 may be securely fastened within a vehicle by inserting a seat belt through slot 48, as is conventional.

This invention has been described with reference to the preferred embodiment. Variations and modifications can be made without departing from the scope of the present invention, which is limited only by the following claims.

What is claimed is:

1. An infant carrier for secure attachment to a shopping cart comprising:

A seating section including a bottom portion, a back portion disposed at an angle to said bottom portion, and side portions disposed adjacent to and substantially perpendicular to said back portion and said bottom portion;

rear side extensions generally parallel to said side portions and including a rear surface having an opening formed therein; and lock means for attaching said seating section to the shopping cart formed in said rear side extensions, said lock means comprising a resilient cantilever member extending into and movable within said opening when said carrier is positioned on said shopping cart, said lock means being formed integrally with said rear surface at a lower end of said opening.

2. The infant carrier as defined by claim 1 wherein said rear side extensions are coplanar with said portions.

3. The infant carrier as defined by claim 1 wherein said resilient member is movable in a direction toward said side portions.

4. An infant carrier for secure attachment to a shopping cart comprising:

a seating section including a bottom portion, a back portion disposed at an angle to said bottom portion, and side portions disposed adjacent to and substantially perpendicular to said back portion and said bottom portion;

rear side extensions each having a rear surface, said rear side extensions being parallel to said side portions; and lock means for attaching said seating section to the shopping cart formed in said rear side extensions, said lock means comprising a resilient member movable within said opening and including a connection end integrally formed in said rear surface, said resilient member having a latch for engaging a horizontal member of the shopping cart.

5. The infant carrier as defined by claim 4 wherein said latch is disposed at an angle to said resilient member.

6. The infant carrier as defined by claim 4 further comprising a protrusion having a recess formed in said rear side extension for receiving the horizontal member.

7. The infant carrier as defined by claim 6 wherein said latch includes an actuation surface for securing said lock means in the attached position and a support surface for retaining the horizontal member within said recess.

8. The infant carrier as defined by claim 6 wherein said rear surface includes an elongated opening having a lower end, said resilient member includes a connection end joined with said rear surface at a lower end of said opening and wherein said resilient member is movable within said opening such that when the horizontal member is pushed against said latch said resilient member moves through said opening in a direction toward said side portions, such that the horizontal member is securely positioned within said recess and abutting said protrusion, said resilient member is biased outwardly such that said latch engages the horizontal member, thereby attaching said seating section to the shopping cart.

9. The infant carrier as defined by claim 8 wherein said latch is disposed at a remote end opposite said connection end and positioned at an angle to said resilient member.

10. The infant carrier as defined by claim 1 wherein said angle is an obtuse angle.

11. The infant carrier as defined by claim 1 further comprising means for retaining said seat in a vehicle.

12. An infant carrier for secure attachment to a horizontal member comprising:

a bottom portion:

a back portion disposed at an angle to said bottom portion;

a pair of side portions adjacent to said bottom portion and said back portion and disposed substantially perpendicular thereto;

a rear side extension substantially coplanar with each side portion and having an elongated opening including a lower end formed therein:

a protrusion disposed on said rear side extension above said opening, a recess being formed between said protrusion and said opening;

a resilient member integrally formed with said rear side extension at said lower end of said opening and disposed within said opening; and a latch for retaining the horizontal member within said recess, said latch disposed at a remote end from said lower end of said opening.

13. The infant carrier as defined by claim 12 wherein said rear side extension includes a recess for receiving the horizontal member.

14. The infant carrier as defined by claim 13 wherein said latch is disposed at an angle to said resilient member and further includes a support surface for retaining the horizontal member in said recess.

15. An infant carrier for secure attachment to a horizontal member, said infant carrier comprising:

a seating section including a bottom portion, a back portion disposed at an angle to said bottom portion, and side portions disposed adjacent to and substantially perpendicular to said back portion and said bottom portion;

rear side extensions coplanar with said side portions, each rear side extension including a protrusion and a rear surface having an elongated opening and having a recess formed between said protrusion and said elongated opening;

a resilient cantilever member disposed within said opening and having a connection end formed integrally with said rear side extensions at a lower end of said opening; and a latch for engaging the horizontal member disposed on said resilient cantilever member at a remote end from said connection end and positioned at an angle to said resilient cantilever member, wherein said resilient member is movable within said opening such that when the horizontal member is pushed against said latch, said resilient cantilever member moves inwardly through said opening and when the horizontal member is positioned within said recess, said resilient cantilever member is biased outwardly such that said latch engages the horizontal member, thereby securely fastening said seating section to the horizontal member.

16. The infant carrier as defined by claim 15 wherein said angle is an obtuse angle.

17. The infant carrier as defined by claim 15 further comprising means for retaining said seat in a vehicle.

18. The infant carrier according to claim 15 further comprising means for securing an infant within said seating section.

19. An infant carrier for secure attachment to a shopping cart comprising:

a seating section including a bottom portion, a back portion disposed at an angle to said bottom portion, and a side portion disposed adjacent to an substantially perpendicular to said back portion and said bottom portion;

a rear side extension parallel to said side portion, said rear side extension having an opening formed therein;

lock means for attaching said seating section to the shopping cart disposed within said opening and integrally formed with one end of said rear side extension, said lock means having a resilient cantilever member extending into and movable within said opening when said carrier is positioned on said shopping cart; and front side protrusions generally parallel to said side portions and including a rear surface having an indentation formed therein.

20. The infant carrier of claim 19 wherein said indentation is adaptable to a front bar of said shopping cart.

* * * * *